(12) United States Patent
Chan et al.

(10) Patent No.: US 7,486,721 B2
(45) Date of Patent: *Feb. 3, 2009

(54) PHYSICAL LAYER DEVICE HAVING AN ANALOG SERDES PASS THROUGH MODE

(75) Inventors: Kevin T. Chan, Pasadena, CA (US); Michael Q. Le, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/892,290

(22) Filed: Aug. 21, 2007

(65) Prior Publication Data

US 2007/0291784 A1 Dec. 20, 2007

Related U.S. Application Data

(63) Continuation of application No. 10/392,831, filed on Mar. 21, 2003.

(60) Provisional application No. 60/365,806, filed on Mar. 21, 2002.

(51) Int. Cl.
*H04B 1/38* (2006.01)
*H03M 9/00* (2006.01)

(52) U.S. Cl. ............... 375/219; 375/259; 341/100; 341/101

(58) Field of Classification Search ............ 375/216, 375/224, 219, 220, 259, 295, 316, 377, 356; 341/50, 100, 101, 108, 110, 126, 144, 146, 341/155; 370/351, 357, 360, 366; 710/1, 710/62, 65, 71

See application file for complete search history.

(56) References Cited

U.S. PATENT DOCUMENTS 4,862,452 A    8/1989    Milton et al.

(Continued)

FOREIGN PATENT DOCUMENTS

EP      0 573 204 A2    12/1993

(Continued)

OTHER PUBLICATIONS

Search Report for European App. No. EP 03006503, dated Sep. 29, 2003, 3 pgs.

(Continued)

*Primary Examiner*—Betsy L Deppe
(74) *Attorney, Agent, or Firm*—Sterne, Kessler, Goldstein & Fox P.L.L.C.

(57) ABSTRACT

A physical layer device (PLD) includes a first serializer-deserializer (SERDES) device and a second SERDES device. Each SERDES device includes an analog portion with a serial port that is configured to communicate serial data with various network devices, and a digital portion that is configured to communicate parallel data with other various network devices. The PLD includes a first signal path that is configured to route serial data signals between the analog portions of the SERDES devices, bypassing the digital portions of the SERDES devices. Therefore, the SERDES devices can directly communicate serial data without performing parallel data conversion. A second signal path is configured to route recovered clock and data signals between the analog portions of the SERDES devices, but still bypassing the digital portions of the SERDES devices. The recovered clock and data signals are then regenerated before being transmitted over a network device.

30 Claims, 4 Drawing Sheets

U.S. PATENT DOCUMENTS

| | | | |
|---|---|---|---|
| 5,095,308 | A | 3/1992 | Hewitt |
| 5,577,023 | A | 11/1996 | Marum et al. |
| 5,768,301 | A | 6/1998 | Dreyer et al. |
| 5,790,946 | A | 8/1998 | Rotzoll |
| 5,907,553 | A | 5/1999 | Kelly et al. |
| 6,026,494 | A | 2/2000 | Foster |
| 6,065,073 | A | 5/2000 | Booth |
| 6,215,764 | B1 | 4/2001 | Wey et al. |
| 6,393,050 | B1 | 5/2002 | Liu |
| 6,418,558 | B1 | 7/2002 | Roberts et al. |
| 6,442,142 | B1 | 8/2002 | Bar-Niv |
| 6,459,393 | B1 * | 10/2002 | Nordman ............ 341/100 |
| 6,487,214 | B1 | 11/2002 | Bachar |
| 6,516,352 | B1 | 2/2003 | Booth et al. |
| 6,678,728 | B1 | 1/2004 | Uppunda et al. |
| 6,691,233 | B1 | 2/2004 | Gannage et al. |
| 6,697,368 | B2 | 2/2004 | Chang et al. |
| 6,735,244 | B1 | 5/2004 | Hasegawa et al. |
| 6,819,760 | B1 | 11/2004 | Nayler |
| 6,868,088 | B2 | 3/2005 | Gibson et al. |
| 6,894,602 | B2 | 5/2005 | Browning |
| 7,020,728 | B1 | 3/2006 | Jones et al. |
| 7,024,489 | B2 | 4/2006 | Aviles |
| 7,027,459 | B2 | 4/2006 | Fukui et al. |
| 7,054,309 | B1 | 5/2006 | Hoot et al. |
| 7,119,701 | B2 | 10/2006 | Browning |
| 7,127,624 | B2 | 10/2006 | Berman et al. |
| 7,149,397 | B2 | 12/2006 | Popovic et al. |
| 7,203,174 | B2 | 4/2007 | Huff |
| 7,257,169 | B2 * | 8/2007 | Shahar et al. ............ 375/340 |
| 2002/0019954 | A1 | 2/2002 | Tran |
| 2002/0023234 | A1 | 2/2002 | Berman et al. |
| 2002/0089972 | A1 | 7/2002 | Chang et al. |
| 2003/0179709 | A1 | 9/2003 | Huff |
| 2003/0179710 | A1 | 9/2003 | Huff |
| 2003/0179711 | A1 | 9/2003 | Huff |
| 2003/0179771 | A1 | 9/2003 | Chan et al. |
| 2003/0179816 | A1 | 9/2003 | Huff et al. |
| 2003/0223469 | A1 | 12/2003 | Deng |
| 2004/0017815 | A1 | 1/2004 | Huff |
| 2005/0111531 | A1 | 5/2005 | Booth et al. |
| 2005/0196119 | A1 | 9/2005 | Popovic et al. |
| 2007/0022310 | A1 | 1/2007 | Berman et al. |

FOREIGN PATENT DOCUMENTS

| | | |
|---|---|---|
| EP | 0 856 975 A2 | 8/1998 |
| EP | 0 856 975 A3 | 8/1998 |
| EP | 0 963 080 A2 | 12/1999 |
| WO | WO 00/59176 A2 | 10/2000 |
| WO | WO 00/59176 A3 | 10/2000 |
| WO | WO 01/47159 A1 | 6/2001 |
| WO | WO 03/081785 A1 | 10/2003 |

OTHER PUBLICATIONS

BCM5411 10/100/1000 Base-T Transceiver Product Brief, Broadcom Corporation, 2 pages, Copyright 2001.

XP000502465: "Power Management Method for Portable Personal Computer with Modem", vol. 38, No. 2, Feb. 1995.

International Search Report from PCT Application No. PCT/US03/08684, filed Mar. 21, 2003, 7 pages (mailing date of search report—Jul. 28, 2003).

10 Gigabit Ethernet Technology Overview White Paper, Revision 1.0, 10GEA: 10 Gigabit Ethernet Alliance, pp. 1-21 (May 2001).

Design Considerations for Next Generation LAN and SAN Gigabit Ethernet Switches, Cicada Semiconductor and SwitchCore Corp., pp. 1-13 (Jun. 2001).

Copy of European Search Report from European Patent Application No. 03006505, 3 pages, dated Sep. 29, 2003.

Complex programmable logic device, online at http://en.wikipedia.org/wiki/CPLD, 2 pages, last modified Jul. 1, 2007.

European Search Report dated Aug. 9, 2007 for Appl. No. 04001941.6, 3 pages.

* cited by examiner

PHYSICAL LAYER DEVICE HAVING AN ANALOG SERDES PASS THROUGH MODE

CROSS-REFERENCE TO RELATED APPLICATIONS

This application is a continuation of U.S. application Ser. No. 10/392,831, filed Mar. 21, 2003, which claims priority to U.S. Provisional Application No. 60/365,806, filed Mar. 21, 2002, both of which are incorporated herein in by reference in their entirety.

BACKGROUND OF THE INVENTION

1. Field of the Invention

The present invention relates generally to data communications.

2. Background

A data communication network includes multiple communication devices and a connection infrastructure or medium for interconnecting or networking the communication devices. The communication devices may include stand-alone computers or embedded controllers. Often, the communication devices include or connect with high-speed analog serial data interfaces or ports configured to operate at Gigabit-per-second (Gbps) data rates. Typically, the serial data interfaces are configured in accordance with known data transmission standards, such as optical fiber and copper wire Ethernet standards. Therefore, there is a need for a connection infrastructure capable of interfacing with such high-speed analog serial data interfaces. It is desirable that the connection infrastructure be capable of operating at the Gigabit-per-second data rates, and in accordance with the different transmission standards.

At any given time, only a subset, such as two, of the communication devices may need to communicate with each other. A direct data connection or path between the two communication devices facilitates high-speed data communication. Over time, different subsets of communication devices require different direct path connections. Therefore, it is desirable that the connection infrastructure be capable of being selectively configurable to provide the different direct path connections between communication devices.

SUMMARY

In an embodiment, the present invention is directed to a communication infrastructure or medium, referred to herein as a physical layer device (PLD), for selectively interconnecting multiple communication devices through high-speed serial data interfaces. The PLD supports high-speed serial data exchanges between the communication devices, at giga-bit-per-second data rates. The PLD supports different data transmission interfaces and standards, such as Ethernet optical fiber and copper line serial data interface standards. The PLD is capable of being selectively configurable to provide different direct path connections between different communication devices.

In an embodiment, the PLD is constructed on a integrated circuit (IC) chip, and includes a first serializer-deserializer (SERDES) device and a second SERDES device. The first SERDES device includes a first analog portion having a first serial port, and a first digital portion having a first parallel port. Likewise, the second SERDES device includes a second analog portion having a second serial port, and a second digital portion having a second parallel port. The first and second analog portions can be connected to various network communications devices through the respective serial ports (e.g. a MAC or fiber module). Furthermore, the parallel ports can also be connected to network devices (e.g. copper phy). The PLD further includes a signal path that connects the first serial port to the second serial port, and which carries the serial data signals between the analog portions of the first SERDES device and the second SERDES device.

The signal path bypasses the digital portions of the first and second SERDES devices. Therefore, the signal path is implemented prior to parallel conversion by the respective digital portions of the SERDES devices, and also prior to recovering the clock and data signals. Therefore, signal latency and hardware requirements are reduced by bypassing the digital portions and thereby avoiding the parallel conversion.

The first and second analog portions recover clock and data signals from the serial data signals received at their respective serial ports. In one embodiment, the PLD includes a second signal path between the first and second analog portions of the SERDES devices. The second signal path is configured to route the recovered clock and data signals between the analog portions of the SERDES devices, but still bypasses the digital portions of the SERDES devices. The recovered clock and data signal are then regenerated before being transmitted to another network device.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings/Figures, which are incorporated herein and form a part of the specification, illustrate the present invention and, together with the description, further serve to explain the principles of the invention and to enable a person skilled in the pertinent art to make and use the invention. In the drawings, like reference numbers indicate identical or functionally similar elements. In the drawings, the indicators "D," "S," "d" and "c" respectively indicate or represent "Deserializer," "Serializer," "data signal," and "clock signal."

DETAILED DESCRIPTION OF THE INVENTION

Figure 1:
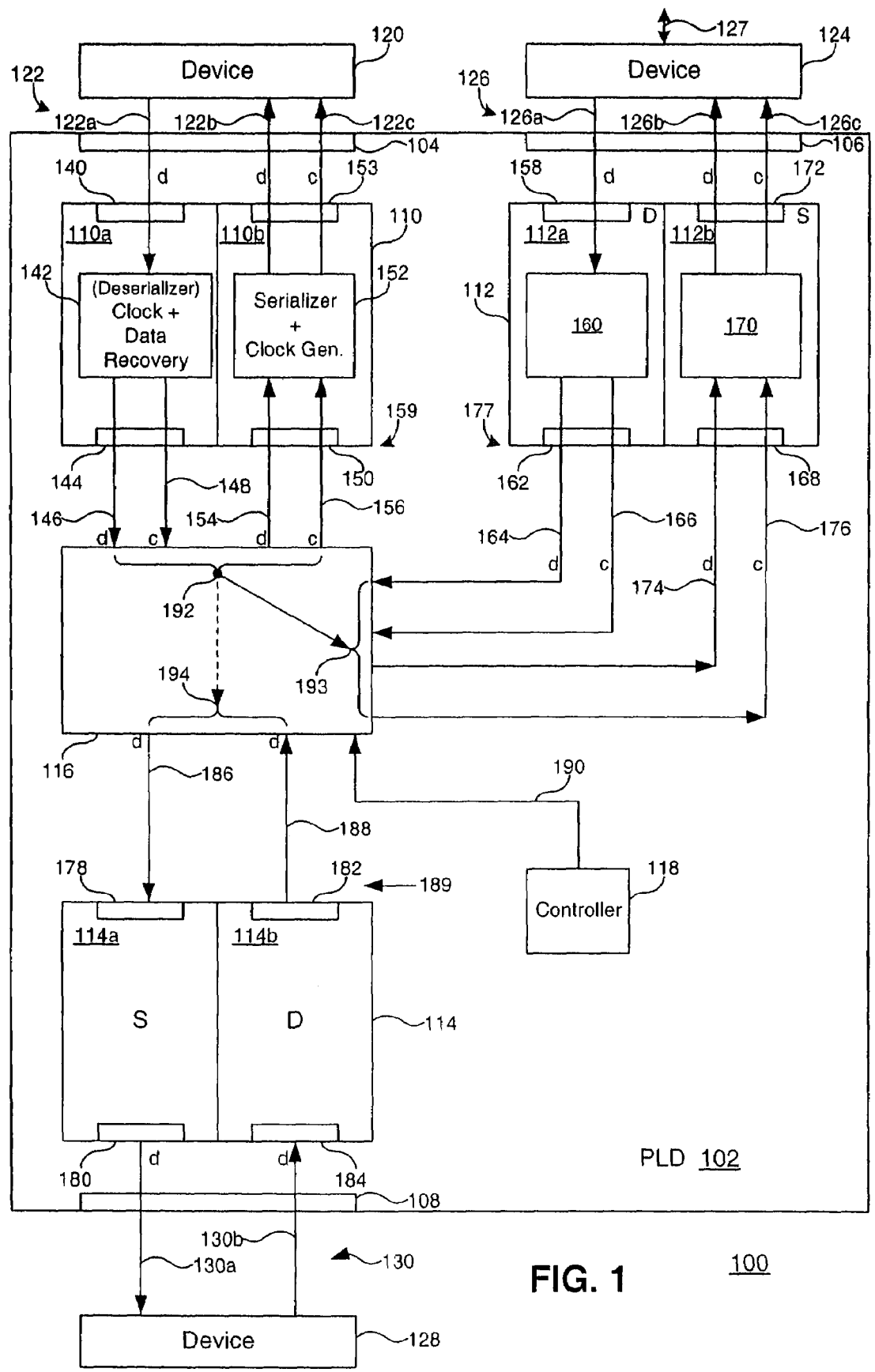
FIG. 1 is a block diagram of an example system in which an example physical layer device (PLD) may operate.

FIG. 1 is a block diagram of an example system 100 in which embodiments of the present invention may operate. System 100 includes a physical layer device (PLD) 102 operated and constructed in accordance with the present invention. In an embodiment, PLD 102 is constructed on a single integrated circuit (IC) substrate or chip. PLD 102 may be implemented in Complementary Metal Oxide Semiconductor (CMOS) technology, for example. Other semiconductor technologies may be used.

PLD 102 includes multiple input/output (I/O) ports 104, 106 and 108. I/O ports 104-108 represent connectors, conductive traces, PLD I/O pins, receivers and drivers, and the like, associated with coupling signals to and from PLD 102. PLD 102 includes a serializer-deserializer (SERDES) device 110 coupled to I/O port 104, a SERDES device 112 coupled to I/O port 106, and a SERDES device 114 coupled to I/O port 108. Each SERDES device includes (i) a transmitter/serializer (S) for serializing a parallel data signal, to produce a serial data signal, and (ii) a receiver/deserializer (D) for deserializing a serial data signal, to produce a parallel data signal, as is described in detail below. PLD 102 also includes a path selector 116 coupled between SERDES devices 110, 112 and 114, and a controller 118 for controlling path selector 116.

PLD 102 interfaces with a communication or network device 120 through I/O port 104 and a high-speed analog serial data interface 122 (where the I/O port and the data interface are collectively referred to as a serial interface of PLD 102). Network device 120 may be a Media Access Controller (MAC). Serial data interface 122 includes bi-directional serial data signals 122a and 122b, and a clock signal 122c synchronized with serial data signal 122b. Bi-directional serial data signals 122a and 122b have example baud rates of 1.25 Gbps, and clock signal 122c has a corresponding example clock rate or frequency of 1.25 GHz.

PLD 102 interfaces with an optical fiber module 124 through I/O port 106 and a high-speed analog serial data interface 126 (where the I/O port and the data interface are collectively referred to as a serial interface of PLD 102). High-speed serial data interface 126 includes bi-directional analog serial data signals 126a and 126b having example baud rates in the gigabit-per-second range. Serial interface 126 also includes a clock signal 126c synchronized with and having a frequency commensurate with serial data signal 126b. Optical fiber module 124 interfaces with an optical line 127. Optical fiber module 124 may operate in accordance with IEEE 802.3 for 1000 Base-X, for example.

SERDES device 114 interfaces with a communication or network device 128 through I/O port 108 and a high-speed analog serial data interface 130 (where the I/O port and the data interface are collectively referred to as a serial interface of PLD 102). Serial data interface 130 includes bi-directional serial data signals 130a and 130b having baud rates in the Gbps range. Serial data signals 130a and 130b may be carried over a copper line associated with an Ethernet link, for example, coupled to I/O port 108. SERDES device 114 may be an Ethernet transceiver that operates in accordance with IEEE 802.3 for 10/100/1000 Base-T, for example. It is understood that optical fiber module 124 and SERDES device 114 are exemplary and may be replaced by a multitude of other interface devices in other arrangements of the present invention. For example, SERDES device 112 and optical system 124 and 127 may be replaced with a transceiver and an associated interface suitable for copper-based signals, while SERDES device 114 and associated interface 130 may be replaced by a transceiver and interface suitable for optical signals, and so on.

SERDES device 110 includes a deserializer 110a and a serializer 110b. Deserializer 110a includes a deserializer input 140, a clock and data recovery module 142, and deserializer output 144. In operation, communication device 120 transmits serial data signal 122a to deserializer input 140. Clock and data recovery module 142 deserializes serial data signal 122a received at deserializer input 140, to produce a deserialized data signal 146. The terms "deserializes" and "deserializing" mean to convert serial data to parallel data. Clock and data recovery module 142 recovers a clock signal 148 from received serial data signal 122a. Recovered clock signal 148 represents received signal timing, for example, the timing of data symbols included in received serial data signal 122a. Deserializer 110a transmits signals 146 and 148 from deserializer output 144. Clock signal 148 is synchronous with data signal 146.

Clock and data recovery module 142 generates deserialized data signal 146 as a series of N1-bit wide parallel digital data words, having a data rate equal to R1/N1, where R1 is the data rate of received serial data signal 122a. Thus, the aggregate data rate of deserialized data signal 146 is equal to the data rate of serial data signal 122a. Module 142 generates clock signal 148 synchronously with deserialized data signal 146, and at a frequency equal to R1/N1. In an example arrangement, N1=10 and R1=1.25 GHz. Thus, serial data signal 122a has a data rate of 1.25 GHz, module 142 generates 10-bit parallel words at a data rate of 125 MHz (1.25 GHz=10 times 125 MHz), and clock signal 148 has a frequency of 125 MHz.

Serializer 110b includes a serializer input 150, a serializer and clock generator module 152, and a serializer output 153. In configurations to be described below, path selector 116 provides a deserialized data signal 154 and an associated clock signal 156 to deserializer input 150. Serializer and clock generator 152 serializes deserialized data signal 154 in accordance with clock signal 156, to produce serialized data signal 122b. The terms "serializes" and "serializing" mean to convert parallel data to serial data. Serializer and clock generator 152 also produces clock signal 122c synchronous with serial data signal 122b. Serializer 110b transmits signals 122b and 122c from serializer output 153.

In an example arrangement, deserialized data signal 154 includes a series of N2-bit wide parallel digital data words, having a data rate equal to R2/N2, where R2 is the data rate of received serial data signal 126a. Thus, the aggregate data rate of deserialized data signal 154 is equal to the data rate of serial data signal 126a. Also, clock signal 156 is synchronous with deserialized data signal 154, and has a frequency equal to R2/N2. In an example arrangement, N2=10 and R2=1.25 GHz. Thus, serial data signal 126a has a data rate of 1.25 GHz, data signal 154 includes 10-bit parallel words at a data rate of 125 MHz (1.25 GHz=10 times 125 MHz), and clock signal 156 has a frequency of 125 MHz. Based on these data and clock rates, serializer 152 generates serial data signal 122b at a data rate of 1.25 GHz, and clock signal 122c at a frequency of 1.25 GHz.

The terms "deserialized" and "parallel" are used equivalently and interchangeably herein. Also, a deserializer output is a parallel data output and a serializer input is a parallel data input. Together, a deserializer output (e.g., deserializer output 144) and a serializer input (e.g., serializer input 150) represent a parallel port of a SERDES device (e.g., a parallel port of SERDES device 110). Similarly, a deserializer input (e.g., deserializer input 140) and a serializer output (e.g., serializer output 153) collectively represent a serial port of a SERDES device (e.g., a serial port of SERDES device 110).

SERDES 112 includes a deserializer 112a and serializer 112b. Deserializer 112a includes a serializer input 158, a clock and data recovery module 160 and a deserializer output 162. Deserializer 112a operates in substantially the same way as deserializer 110a. Serializer input port 158 receives serial data signal 126a. Clock and data recovery module 160 deserializes received serial data signal 126a, to produce deserialized or parallel data signal 164. Module 160 also recovers a clock signal 166 from received serial data signal 126a. From deserializer output 162, deserializer 112a transmits signals 164 and 166 to path selector 116.

Serializer 112b operates in substantially the same way as serializer 110b. In configurations to be described below, path selector 116 provides a deserialized or parallel data signal 174 and its associated clock signal 176 to serializer input 168. Serializer and clock generator module 170 serializes deserialized data 174 in accordance with clock signal 176, to produce serial data signal 126b and its associated clock signal 126c. Data signal 126b and clock signal 126c have example data and clock rates in the GHz range. Together, deserializer output 162 and serializer input 168 represent a parallel port 177 of SERDES device 112. SERDES device 112 supports example data rates and uses parallel data bit-widths similar to or the same as those of SERDES device 110, mentioned above. In an alternative arrangement, module 170 generates only a serial data signal that essentially encapsulates both data and clock signals 126b and 126a.

SERDES 114 includes a deserializer 114a and a serializer 114b. Serializer 114a include a serializer input 178 and a serializer output 180. Deserializer 114b includes a deserializer input 184 and a deserializer output 182. In configurations to be described below, path selector 116 provides a deserialized data signal 186 to serializer input 178. Serializer 114a serializes deserialized data signal 186 into serialized data signal 130a, and transmits the serialized data signal from serializer output 180. Deserializer 114b receives serial data signal 130b at deserializer input 184. Deserializer 114b deserializes serial data signal 130b, to produce deserialized data signal 188. Deserializer 114b transmits deserialized data signal 188 to path selector 116, from deserializer output 182. Together, deserializer output 182 and serializer input 178 represent a parallel port 189 of SERDES device 114. SERDES device 114 may support example data rates similar to or the same as those of SERDES devices 110 and 112, mentioned above. SERDES device 114 may support parallel data bit-widths different from those used with SERDES devices 110 and 112, for the reason discussed below in connection with FIG. 3. In another embodiment, SERDES device 114 generates clock signals associated with data signals in a manner similar to SERDES devices 110 and 112.

Controller 118 provides a control signal 190 to path selector 116. Control signal 190 selects alternative first and second configurations of path selector 116. That is, path selector 116 is selectively configurable responsive to control signal 190. At a high level, path selector 116 can be considered to include a switch having connection nodes 192, 193 and 194, respectively coupled to parallel ports 159, 177 and 189. The switch has selectable first and second positions corresponding to the first and second configurations mentioned above.

The first switch position (depicted in FIG. 1) couples together nodes 192 and 193, while the second position couples together nodes 192 and 194. Thus, in the first switch position, selector 116 couples parallel port 159 to parallel port 177, whereby bi-directional de-serialized data signals and their associated clock signals are routed between these parallel ports. This configuration is referred to as a SERDES pass-through mode. Alternatively, in the second switch position, selector 116 couples parallel port 159 to parallel port 189, whereby bi-directional serial data signals are routed between these parallel ports. Thus, path selector 116 is selectively configurable to provide either:

(i) in a first configuration, a bi-directional signal path between parallel port 159 of SERDES device 110 and parallel port 177 of SERDES device 112; or (ii) in a second configuration, a bi-directional signal path between parallel port 159 of SERDES device 110 and parallel port 189 of SERDES device 114.

The bi-directional signal paths provided by path selector 116 carry parallel data, and clock signals when appropriate, between the respective parallel ports of SERDES devices 110, 112 and 114. The first configuration of path selector 116 essentially interconnects communication or network devices 120 and 124, whereby these devices can exchange data with each other at Gbps data rates, through PLD 102. More specifically, devices 120 and 124 exchange data through their respective serial interfaces, SERDES devices 110 and 112, and path selector 116.

The second configuration of path selector 116 essentially interconnects communication or network devices 120 and 128, whereby these devices can also exchange data at Gbps data rates through their respective serial interfaces, SERDES devices 110 and 114, and path selector 116. From the perspective of device 120, PLD 102 provides a single IC chip connection infrastructure that selectively interconnects device 120 to either of devices 124 and 128, through the single serial interface (122) of device 120. This reduces the number of communication ports associated with device 120, and the number of I/O pins required on any communication port of device 120 that interfaces with PLD 102.

Figure 2B:
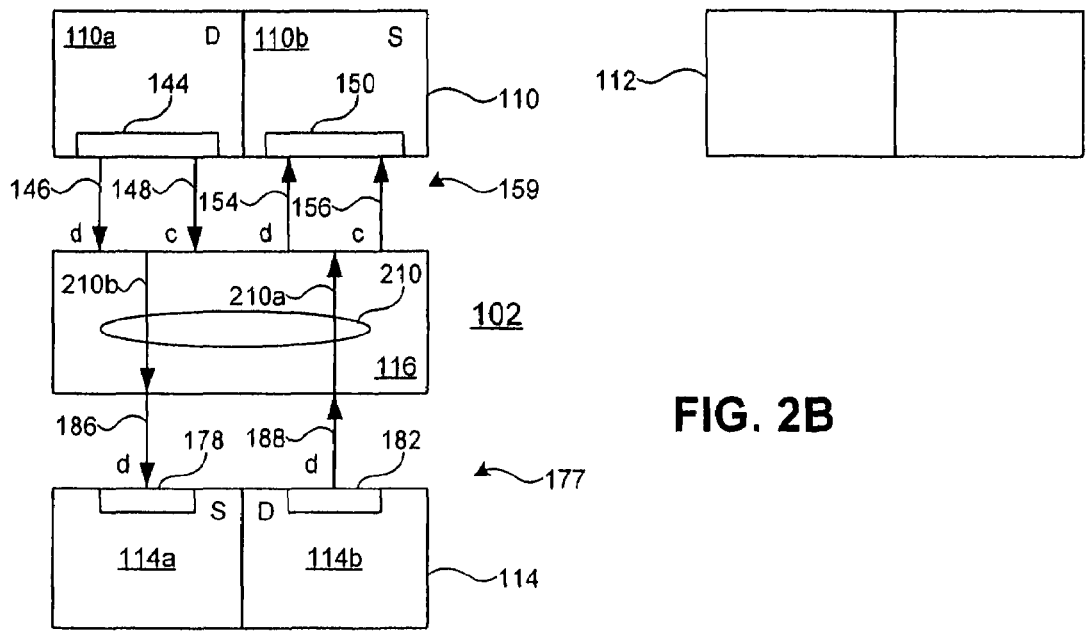
FIG. 2B is a block diagram of a portion of the PLD of FIG. 1, corresponding to when the path selector is in a second configuration.
Figure 2A:
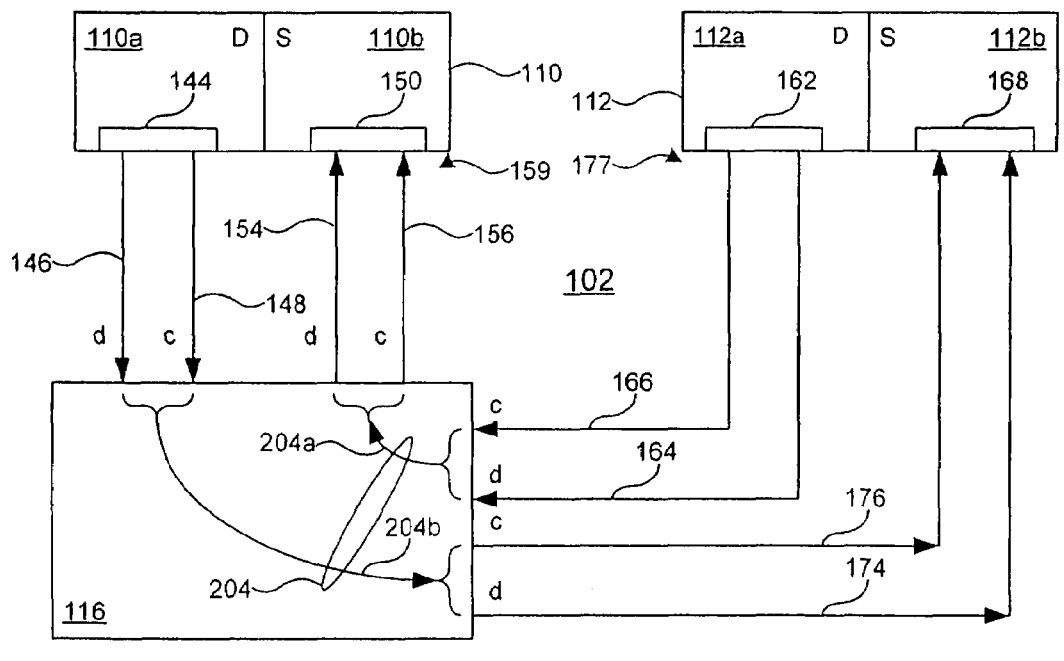
FIG. 2A is a block diagram of a portion of the PLD of FIG. 1, corresponding to when a path selector of the PLD is in a first configuration.

FIG. 2A is a block diagram of a portion of PLD 102 corresponding to when path selector 116 is in, or set to, the first configuration. In the first configuration, path selector 116 provides bi-directional signal paths 204a and 204b (collectively, bi-directional signal path 204) for routing signals between parallel port 159 of SERDES device 110 and parallel port 177 of SERDES device 112. Specifically, signal path 204a routes data and clock signals 164 and 166 from deserializer output 162 to serializer input 150. In the first configuration, data signals 154 and 164 are the same and clock signals 156 and 166 are the same. Also, signal path 204b routes data and clock signals 146 and 148 from deserializer output 144 to serializer input 168. In this configuration, deserialized data signals 174 and 146 are the same and recovered clock signals 176 and 148 are the same.

FIG. 2B is a block diagram of a portion of PLD 102 corresponding to when path selector 116 is in the second configuration. In the second configuration, path selector 116 provides bi-directional signal paths 210a and 210b (collectively, bi-directional signal path 210) for routing bi-directional deserialized data signals between parallel port 159 and parallel port 177. Specifically, signal path 210a routes data signal 188 from deserializer output 182 to serializer input 150. In the first configuration, data signals 188 and 154 carry the same data content. Also, signal path 204b routes data signal 146 from deserializer output 144 to serializer input 178. In this configuration, deserialized data signals 146 and 186 carry the same data content. In the second configuration, path selector 116 generates clock signal 156 synchronous with data signal 154, in the manner described below in connection with FIG. 3.

Figure 3:
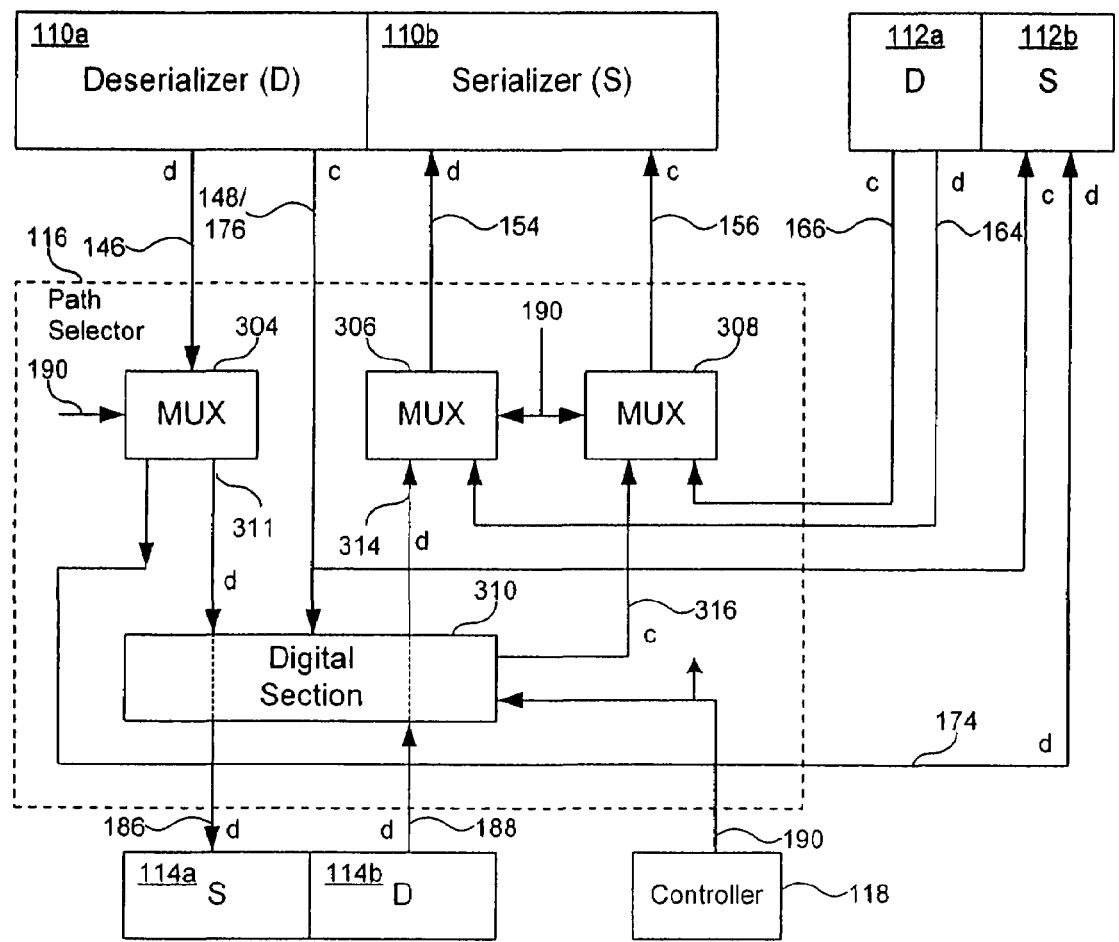
FIG. 3 is a block diagram of an example arrangement of the path selector.

FIG. 3 is a block diagram of an example arrangement of path selector 116. All of the data signal paths depicted in FIG. 3 are parallel data paths. Path selector 116 includes a plurality of multiplexers or selectors 304, 306 and 308, and a digital processor section 310 (also digital section). Controller 118 configures each of the mutiplexers or selectors 304-308 and digital section 310 as appropriate to set path selector 116 in either the first configuration or the second configuration, according to control signal 190. Thus, mutiplexers 304, 306 and 308 are collectively referred to herein as multiplexer logic that is configurable to support either the first or second configuration according to control signal 190.

Controller 118 sets control signal 190 to either a first value or a second value to respectively set path selector 116 to either the first configuration or the second configuration. For example, in an arrangement where control signal is a digital signal, controller 118 sets control signal to either a logic "0" or a logic "1" to respectively configure path selector 116 in either the first configuration or the second configuration. Alternatively, the polarity of control signal 190 may be reversed. In another arrangement, controller 118 generates multiple control signals.

Digital section 310 includes digital control and signal processing logic to perform exemplary functions such as data encoding, data packetizing, data decoding and data depacketizing, when path selector 116 is set to the second configuration, as described below. Digital section 310 also includes an enable circuit (not shown) to selectively disable or enable the operation of the digital section responsive to control signal 190, when path selector 116 is in the first and second configurations, respectively. In an arrangement, the enable circuit is a switch, connected between a power supply rail of PLD 102 and operational circuits of digital section 310, responsive to control signal 190. The switch removes power from the operational circuits of digital section 310, to disable the digital section, when path selector 116 is set to the first configuration. In the second configuration, the switch applies power to the operational circuits of digital section 310, to enable the digital section.

When control signal 190 sets path selector 116 to the first configuration, the path selector operates as follows. Multiplexer 304 passes deserialized data signal 146 to serializer 112b, as deserialized data signal 174. Multiplexer 306 passes deserialized data signal 164 to serializer 110b, as deserialized data signal 154. Multiplexer 308 passes clock signal 166 to serializer 110b, as clock signal 156. Clock signal 148 passes from deserializer 110a, directly through path selector 116, to serializer 112b. Thus, the first signal path through path selector 116 includes multiplexers 304, 306 and 308 configured as just described.

When control signal 190 sets path selector 116 to the second configuration, the path selector operates as follows. Multiplexer 304 passes deserialized data signal 146 to an input of digital section 310, as data signal 311. Digital section 310 processes deserialized data signal 311/146, to produce deserialized data signal 186. For example, digital section 310 may reformat deserialized data signal 146 by removing error correction and packet protocol bits from deserialized data signal 146. Digital section 310 also receives deserialized data signal 188 from deserializer 114b. Digital section 310 generates a deserialized data signal 314 from deserialized data signal 188. For example, digital section 310 may reformat deserialized data signal 188 by adding error correction and packet protocol bits to the signal 188.

Multiplexer 306 passes deserialized data signal 314 to serializer 110b, as deserialized data signal 154. Digital section 310 generates a data clock 316 synchronous with deserialized data signal 314. Multiplexer 308 passes data clock 316 to serializer 110b, as clock signal 156. Thus, the second signal path through path selector 116 includes multiplexers 304, 306 and 308, and digital section 310, configured as just described.

Figure 4:
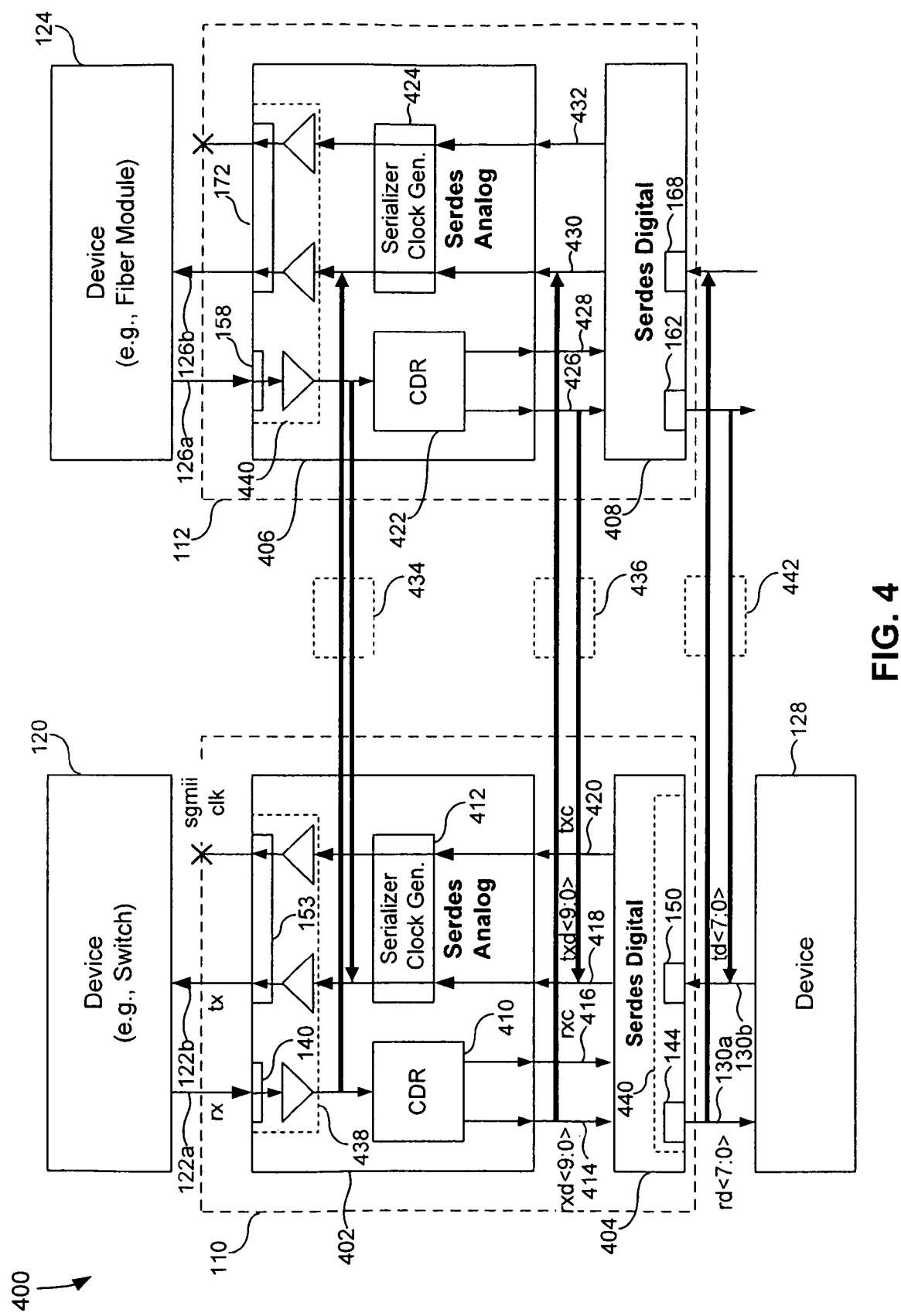
FIG. 4 illustrates a block diagram of analog SERDES-to-SERDES pass through mode.

FIG. 4 illustrates a physical layer device 400 having a SERDES pass through mode from the SERDES device 110 to the SERDES device 112 that is performed entirely in the analog domain. In other words, serial data is passed between SERDES devices 110 and 112 without parallel conversion and without digital conversion, so that parallel data ports (e.g. 144, 150, 162, 168) are bypassed. By sending serial data between SERDES devices, this precludes any frequency conversion and/or bit stuffing that would be required in the digital domain. Therefore, the analog SERDES-to-SERDES pass through reduces latency and hardware requirements when compared to the digital domain techniques.

Referring to FIG. 4, the SERDES device 110 from FIG. 1 is further defined to include an analog portion 402 and a digital portion 404. This is done for ease of the following discussion of the analog SERDES pass through mode. Likewise, the SERDES device 112 is further defined to include an analog portion 406 and a digital portion 408.

In the SERDES device 110, the analog portion 402 includes a serial data port 438 having the deserializer input 140 and the serializer output 153, a clock and data recovery module 410, and a serializer and clock generator module 412. The digital portion 404 includes the parallel deserializer output 144 and the de-serialized input 150. The functionality of the analog and digital portions and their respective components will be further described below.

The clock and data recovery module 410 is only a portion of the clock and data recovery module 142 in FIG. 1. More specifically, the clock and data recovery module 410 only recovers a serial data 414 and clock signal 416, but does not perform the serial-to-parallel conversion, as the parallel conversion is performed by the SERDES digital device 404. The digital portion 404 receives the serial data 414 and the clock signal 416. The digital portion 404 performs the data rate conversion R1/N1 discussed above, and generates the parallel deserializer output 144 that is communicated to the device 128. Likewise, the serializer and clock generator 412 is only a portion of the serializer and clock generator 152. More specifically, the digital portion 404 receives the parallel deserialized signal input 150, and performs the parallel-to-serial conversion along with the serializer and clock generator 412. For example, the digital portion 404 performs the data rate conversion N1/R1, and also performs any bit stuffing or comma stuffing that is necessary to align data and or clock rates between the device 128 and the devices 120 or 124. After which, the digital portion generates aligned data 418 and clock 420 that is sent to the serializer and clock generator 412 in the analog portion 402 for further processing.

In the SERDES device 112, the analog portion 406 includes a serial data port 440 having the deserializer input 158 and the serializer output 172, a clock and data recovery module 422, and a serializer and a clock generator module 424. The digital portion 408 includes the parallel deserializer output 162 and the de-serialized input 168.

Referring to the analog portion 406, the clock and data recovery module 422 is only a portion of the clock and data recovery module 160 in FIG. 1. More specifically, the clock and data recovery module 422 only recovers a serial data 426 and clock signal 428, but does not perform the serial-to-parallel conversion, as the parallel conversion is performed by the digital portion 408. The digital portion 408 receives the serial data 426 and the clock signal 428. The digital portion 408 performs the data rate conversion R1/N1 discussed above, and generates a parallel output signal at the parallel deserializer output 162 that can be communicated to the device 128. Likewise, the serializer and clock generator 424 is only a portion of the serializer and clock generator 170. More specifically, the digital portion 408 receives the parallel data at the parallel deserialized input 168, and performs the part of the parallel-to-serial conversion along with the serializer and clock generator 424. For example, the digital portion 408 performs the data rate conversion N1/R1, and also perform any bit stuffing or comma stuffing that is necessary to align data and or clock rates between the device 128 and the devices 120 or 124. After which, the digital portion generates aligned data 430 and clock 432 that is sent to the serializer and clock generator 424 in the analog portion 110 for further processing.

The SERDES-to-SERDES analog pass through mode is implemented using signal path 434 or signal path 436. A feature of the signal paths 434 and 436 is that they are implemented directly between the analog portion 402 and 406, and therefore bypass the digital portions 404 and 408. The signal path 434 directly connects the first serial port 438 to the second serial port 440, and carries said serial data signals between respective analog portions of the first SERDES device 110 and the second SERDES device 112. The signal path 436 directly connects recovered clock and data signals between the analog portion 402 and the analog portion 406. More specifically, the output of the clock and data recovery module 410 from the analog portion 402 is directly connected to the input of the serializer clock generator 424. Likewise, the output of the clock and data recovery module 422 from the analog portion 406 is directly connected to the input of the serializer clock generator 412.

The signal path 434 carries bi-directional serial data signals between the first analog portion 402 and the second analog portion 406. More specifically, the signal path 434 carries serial data signals 122a that are received from the device 120 to the serial port 440 for re-transmission as serial data 126b over the device 124. The first signal path 434 also carries data signals 126a that are received from the device 124 to the serial port 438 for re-transmission as serial data 122b over the device 120. It is noted that the signal data path 434 is implemented prior to parallel conversion by the digital portion 404, and also prior to recovering the clock and data. Therefore, the data signals carried by the first signal path 434 are serial data signals that include combined clock and data information. Furthermore, signal latency is reduced by not performing the parallel conversion. Still further, hardware requirements are reduced because the bit rate change is also avoided.

In one embodiment, the device 120 is a media access controller (MAC), the device 124 is a fiber module, and the device 128 is an Ethernet device (e.g. copper phy). Therefore, serial data 122 from the MAC 124 that is intended for the Ethernet device 128 can be immediately re-transmitted back out to the fiber module 124. This enables various applications such as testing serial data signals that are received from MAC 120 at the fiber module 124. For example, serial data signals from the MAC 124 that are intended for the Ethernet device 128, can be sniffed or tested by the fiber module 124.

The signal path 436 carries bi-directional clock and data signals between the first analog portion 402 and the second analog portion 406. More specifically, the signal path 436 carries recovered serial data 414 and clock 416 from the output the clock and data recovery module 410 to the serializer and clock generator module 424. In other words, the serial data 414 is received at the input 430, and the clock signal 416 is received at the input 432. The clock rate 416 of the analog portion 402 of the SERDES device 110 may be different from the clock rate of the analog portion 406 of the SERDES device 112. Therefore, the serializer and clock generator 424 regenerates the serial and clock data signals so that they are compatible with the device 124. The signal-to-noise ratio is improved by regenerating clock and data signals prior to re-transmission.

The signal path 436 carries recovered serial data 426 and clock 428 from the output the clock and data recovery module 422 to the serializer and clock generator module 412. In other words, the serial data 426 is received at the input 418, and the clock signal 428 is received at the input 420. The clock rate 428 of the analog portion 406 of the SERDES device 112 may be different from the clock rate of the analog portion 402 of the SERDES device 110. Therefore, the serializer and clock generator 412 regenerates the serial and clock data signals so that they are compatible with the device 120. The signal-to-noise ratio is improved by regenerating clock and data signals prior to re-transmission.

Additionally, the receive clock 416 can be routed through the signal path 436 to the transmit clock 432. Likewise, the receive clock 428 can be routed through the signal path 436 to the transmit clock 420. (This is not shown in FIG. 4 for ease of illustration.)

Additionally, if a clock is received with the signal 122, then it can be looped back through the signal path 434 to the serial port 440 for re-transmission at the device 124. Similarly, if a clock is received with the signal 126, then it can also be looped back through the signal path 434 for transmission to the device 120.

The signal path 442 carries bi-directional parallel data signals between the digital portion 404 in the SERDES device 110 and the digital portion 408 in the SERDES device 112. More specifically, the signal path 442 carries parallel data 130a from the parallel deserialized output 144 to the parallel input 162 of the digital portion 408. The digital portion 408 may perform bit stuffing or comma stuffing in the parallel data to align the data rates between the digital portion 404 and the digital portion 408. Likewise, the signal path 442 also carries parallel data from the parallel deserialized output 162 of the digital portion 408 to the parallel input 150 of the digital portion 404. The signal path 442 can be used to re-transmit data from the device 124 to the devices 120, or even the device 124. However, unlike signal paths 434 and 436, digital conversion is necessary.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by analog and/or digital circuits, discrete components, application specific integrated circuits, firmware, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A physical layer device (PLD), comprising:
    a first serializer-deserializer (SERDES) device including (i) a first analog portion having a first serial port, and (ii) a first digital portion coupled to said first analog portion and having a first parallel port;
    a second SERDES device including (i) a second analog portion having a second serial port, and (ii) a second digital portion coupled to said second analog portion having a second parallel port; and
    a first signal path that directly connects said first serial port to said second serial port, bypassing said first digital portion and said second digital portion.

2. The PLD of claim 1, wherein said first signal path carries serial data signals between said analog portions of said first SERDES device and said second SERDES device.

3. The PLD of claim 1, wherein said physical layer device is part of a network device.

4. The PLD of claim 1, wherein said physical layer device is part of a data switch operating in a network environment.

5. The PLD of claim 1, wherein said physical layer device is a part of a data communications device.

6. The PLD of claim 1, wherein said first serial port interfaces with a network device.

7. The PLD of claim 6, wherein said network device includes a media access controller.

8. The PLD of claim 1, wherein said second serial port interfaces with a fiber module.

9. The PLD of claim 1, wherein said first serial port of said first SERDES device interfaces with a network device.

10. The PLD of claim 9, wherein said network device is a Ethernet device.

11. The PLD of claim 1, wherein:
said first serial port interfaces with a media access controller;
said second serial port interfaces with a fiber module; and
said first parallel port interfaces with a Ethernet device.

12. The PLD of claim 11, wherein said Ethernet device includes a copper physical layer device.

13. The PLD of claim 1, wherein said second serial port is configured to transmit a first serial data signal received from said first analog portion, and said first serial port is configured to transmit a second serial data signal received from said second analog portion.

14. The PLD of claim 1, further comprising a second signal path between said first analog portion and said second analog portion that is configured to route recovered clock and data signals between said first and second analog portions, bypassing said first and second digital portions.

15. The PLD of claim 14, wherein said second analog portion in said second SERDES device is configured to regenerate recovered clock and data signals from said first analog portion according to a clock rate of said second analog portion.

16. The PLD of claim 14, wherein:
said first analog portion includes,
  (i) a first clock and data recovery module having an input coupled to said first serial port that recovers data and clock from said first serial port and sends said recovered data and clock to said digital portion of said first SERDES device;
  (ii) a first serializer and clock generator module having an input coupled to said digital portion of said first SERDES device and having an output coupled to said first serial port of said first analog portion;
said second analog portion includes,
  (i) a second clock and data recovery module having an input coupled to said second serial port that recovers data and clock from said second serial port and sends said recovered data and clock to said digital portion of said second SERDES device; and
  (ii) a second serializer and clock generator module having an input coupled to said digital portion of said second SERDES device and having an output coupled to said second serial port of said second analog portion.

17. The PLD of claim 16, wherein said first signal path routes serial data from an input of said first clock and data recovery module to an input of said second serial port, and routes serial data from an input of said second clock and data recovery module to an input of said first serial port.

18. The PLD of claim 16, wherein said second signal path routes said recovered clock and data from an output of said first clock and data recovery module to an input of said second serializer and clock generator module, and said routes said recovered clock and data from an output of said second clock and data recovery module to an input of said first serializer and clock generator module.

19. The PLD of claim 18, wherein said second serializer and clock generator is configured to regenerate said recovered clock and data from said first clock and data recovery module prior to transmission over said second serial port, and wherein said first serializer and clock generator module is configured to regenerate said recovered clock and data from said second clock and data recovery module prior to transmission over said second serial port.

20. The physical layer device of claim 1, wherein said first SERDES device, said second SERDES device, and said first signal path are disposed on a common substrate.

21. The physical layer device of claim 20, wherein said common substrate is a CMOS substrate.

22. On a substrate having a first SERDES device and a second SERDES device, each SERDES device having an analog portion and a digital portion, a method comprising:
receiving serial data from a first network device at a first analog portion of said first SERDES device; and
routing said serial data from said first analog portion of said first SERDES device to a second analog portion of said second SERDES device, and bypassing respective digital portions of said first and second SERDES devices.

23. The method of claim 22, further comprising transmitting said serial data from said second analog portion of second SERDES device over a second network device.

24. The method of claim 22, wherein said first SERDES device and said second SERDES device are part of a data communications device.

25. The method of claim 24, wherein said data communications device operates according to an Ethernet standard.

26. A data communications device, comprising:
a first serializer-deserializer (SERDES) device including a first analog portion, and a first digital portion coupled to said first analog portion;
a second SERDES device including a second analog portion and a second digital portion coupled to said second analog portion; and
a signal path configure to route serial data signals between said first analog portion and said second analog portion, bypassing said digital portions of said first and second SERDES devices.

27. The data communications device of claim 26, wherein said first SERDES device is configured to transmit and receive serial data signals to a first network device and parallel data signals to a second network device.

28. The data communications device of claim 26, wherein said second SERDES device is configured to transmit and receive serial data signals to a third network device.

29. The data communications device of claim 26, further comprising a second signal path configured to route recovered data and clock signals between said first and second analog portions.

30. The data communications device of claim 26, wherein the data communications device is coupled to an Ethernet network.

* * * * *